(12) United States Patent
Ibarra

(10) Patent No.: US 11,866,951 B2
(45) Date of Patent: Jan. 9, 2024

(54) PORTABLE MULTI-FUNCTIONAL UMBRELLA STAND

(71) Applicant: Pedro J. Ibarra, Camarillo, CA (US)

(72) Inventor: Pedro J. Ibarra, Camarillo, CA (US)

(*) Notice: Subject to any disclaimer, the term of this patent is extended or adjusted under 35 U.S.C. 154(b) by 5 days.

(21) Appl. No.: 17/135,580

(22) Filed: Dec. 28, 2020

(65) Prior Publication Data

US 2022/0205268 A1 Jun. 30, 2022

(51) Int. Cl.
*E04H 12/22* (2006.01)
*A47G 25/12* (2006.01)
*F16M 13/02* (2006.01)

(52) U.S. Cl.
CPC ......... *E04H 12/2269* (2013.01); *A47G 25/12* (2013.01); *E04H 12/22* (2013.01); *E04H 12/2238* (2013.01); *A45B 2200/1009* (2013.01); *F16M 13/02* (2013.01)

(58) Field of Classification Search
CPC . E04H 12/2269; E04H 12/2238; E04H 12/22; A47G 25/12; F16M 13/02; A45B 11/00; A45B 2025/003; A45B 23/00; A45B 25/00; A45B 2023/0012; A45B 2200/1009
USPC .......................................................... 248/519
See application file for complete search history.

(56) References Cited

U.S. PATENT DOCUMENTS

| | | | | |
|---|---|---|---|---|
| 3,602,466 A * | 8/1971 | Drowns | ................. | A45B 11/00 248/314 |
| 3,904,161 A * | 9/1975 | Scott | ................... | A45B 11/00 248/231.71 |
| 4,609,175 A * | 9/1986 | Conover | ................. | A45B 11/00 211/62 |
| 4,641,478 A * | 2/1987 | Nelson, Jr. | .............. | E04H 12/22 52/700 |
| 4,805,654 A * | 2/1989 | Wang | ...................... | B60J 11/00 296/136.03 |
| 5,271,196 A * | 12/1993 | Fanti | ....................... | E04H 12/22 52/165 |
| 5,354,031 A * | 10/1994 | Bilotti | ................. | E04H 12/2238 248/910 |
| 5,687,946 A * | 11/1997 | Cho | ........................ | A45B 11/00 248/533 |
| 5,836,327 A * | 11/1998 | Davis | ................... | F16M 13/022 248/515 |
| 6,520,194 B1 * | 2/2003 | Frazier | ..................... | A45B 1/04 135/76 |
| 6,554,012 B2 * | 4/2003 | Patarra | ..................... | A45B 3/00 62/331 |

(Continued)

*Primary Examiner* — Taylor Morris
(74) *Attorney, Agent, or Firm* — Perkins Coie LLP; Brian Coleman; Louis Yang

(57) ABSTRACT

Introduced here is an umbrella stand capable of securely holding umbrellas of various sizes, shapes, and weights. The umbrella stand includes a base and a holder portion. The base includes mechanisms to secure the umbrella stand to a surface such as ground spikes or suction cups. The holder portion is connected to the base via abutments that protrude up from the periphery of the base. The holder portion and the base are separated by a gap. The holder portion includes tightening mechanisms and a door. The tightening mechanisms help securely hold an umbrella handle or shaft and can adjust the angle at which the umbrella is held. The door, in combination with the gap, allow a user to use the umbrella stand with umbrellas with handles of various shapes and sizes.

12 Claims, 14 Drawing Sheets

(56) References Cited

U.S. PATENT DOCUMENTS

| | | | | |
|---|---|---|---|---|
| 6,612,320 | B2* | 9/2003 | Lin | A45B 25/22 135/33.7 |
| 6,708,703 | B1* | 3/2004 | Rivers | F16M 11/046 248/214 |
| 6,971,613 | B2* | 12/2005 | Shendelman | A47G 19/06 211/205 |
| 7,784,761 | B2* | 8/2010 | Ma | E04H 12/2238 403/104 |
| 8,146,879 | B2* | 4/2012 | Liao | A45B 11/00 248/278.1 |
| 8,308,123 | B1* | 11/2012 | Accordino | A45C 13/40 248/220.21 |
| 8,381,413 | B2* | 2/2013 | Smith | F26B 25/08 211/DIG. 1 |
| 8,714,511 | B2* | 5/2014 | Zoeteman | A45B 11/00 248/537 |
| 8,978,676 | B2* | 3/2015 | Williams | E04H 12/22 248/156 |
| 9,249,596 | B2* | 2/2016 | Williams | E04H 12/2238 |
| 9,463,850 | B2* | 10/2016 | Lovett | A45B 25/00 |
| 9,890,551 | B1* | 2/2018 | Delao | E04H 15/62 |
| 9,949,540 | B2* | 4/2018 | Gharabegian | H02S 20/30 |
| 9,968,167 | B2* | 5/2018 | Volin | F16B 7/182 |
| 10,039,353 | B2* | 8/2018 | Mullet | A45B 3/00 |
| 10,149,523 | B2* | 12/2018 | Cooley | A45B 25/00 |
| 10,306,960 | B2* | 6/2019 | Patterson | A45B 25/00 |
| 10,428,552 | B2* | 10/2019 | Sinclair | E04H 17/22 |
| 10,501,957 | B1* | 12/2019 | Borowiak | E01F 9/685 |
| 10,925,360 | B1* | 2/2021 | Schwiebert | A47C 13/00 |
| 11,076,663 | B2* | 8/2021 | Mullet | A45B 25/006 |
| 2009/0071516 | A1* | 3/2009 | Li | H04R 1/026 135/16 |
| 2012/0145878 | A1* | 6/2012 | Zoll | F16M 11/38 248/688 |
| 2014/0263926 | A1* | 9/2014 | LeAnna | E04H 12/2253 248/518 |
| 2014/0366784 | A1* | 12/2014 | Berger | A45B 25/00 109/23 |
| 2015/0060631 | A1* | 3/2015 | Pan | F16B 9/056 403/374.3 |
| 2015/0216274 | A1* | 8/2015 | Akin | H02J 7/0013 29/434 |
| 2015/0305453 | A1* | 10/2015 | Gatto-Weising | A47G 25/12 248/516 |
| 2016/0119699 | A1* | 4/2016 | Caban | H04R 1/025 29/428 |
| 2016/0194895 | A1* | 7/2016 | Whiteley | E04H 12/22 248/346.5 |
| 2016/0326765 | A1* | 11/2016 | Barbret | E04H 15/02 |
| 2018/0126914 | A1* | 5/2018 | Ferreri | B62B 9/147 |
| 2018/0263394 | A1* | 9/2018 | Thomas | A47C 11/00 |
| 2020/0066266 | A1* | 2/2020 | Gharabegian | H04N 23/90 |
| 2020/0085220 | A1* | 3/2020 | McCullough | A47G 25/12 |
| 2020/0128955 | A1* | 4/2020 | Molnar | F24F 1/03 |
| 2022/0000249 | A1* | 1/2022 | Cohen | E02D 5/801 |
| 2022/0127872 | A1* | 4/2022 | Chen | A47B 13/16 |

* cited by examiner

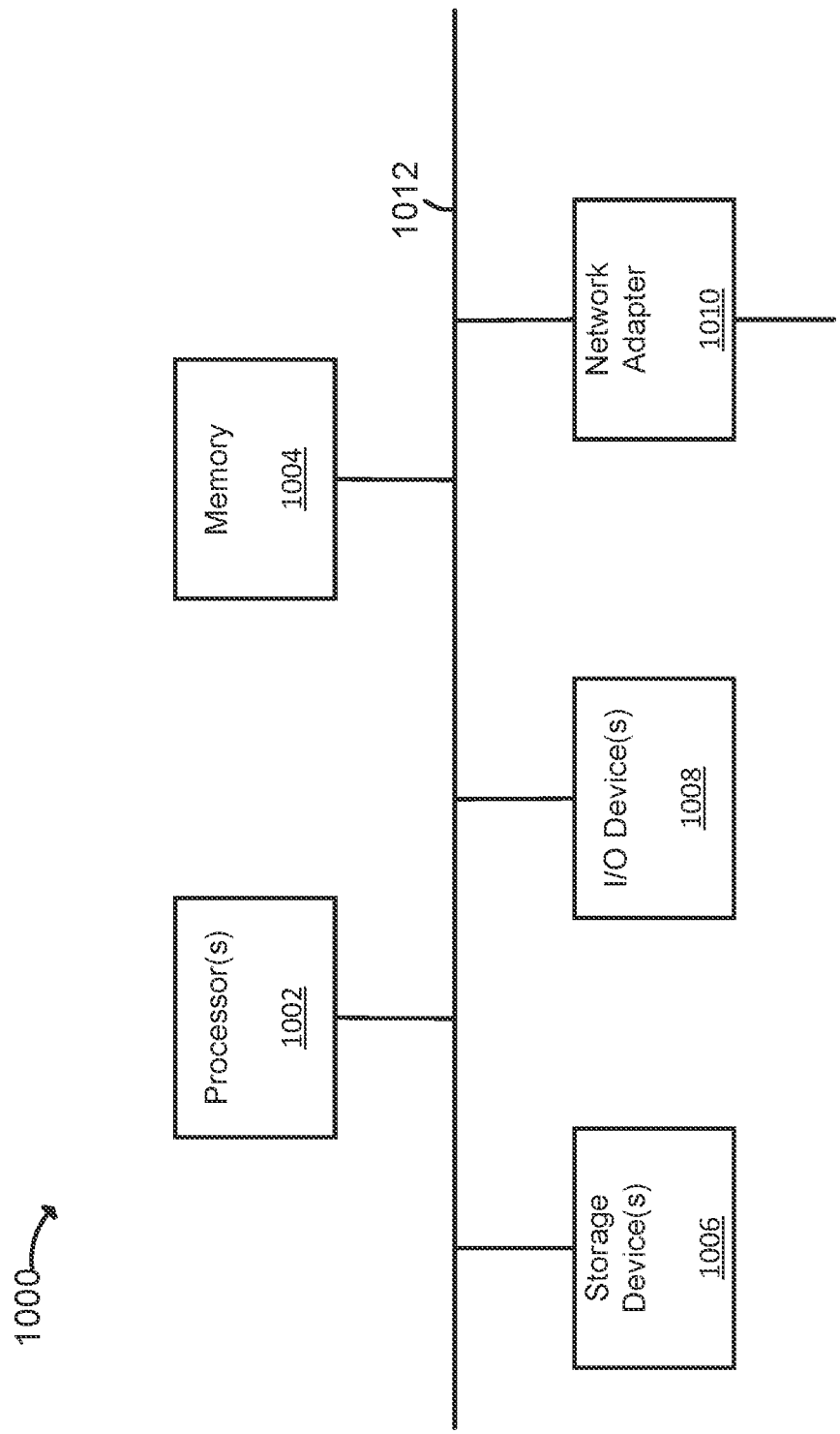

PORTABLE MULTI-FUNCTIONAL UMBRELLA STAND

TECHNICAL FIELD

Various embodiments concern umbrella stands and associated variations of umbrella stands capable of holding umbrellas of various shapes, sizes, and weight.

BACKGROUND

People are exposed to sunlight throughout their lives for various reasons. For example, some may voluntarily spend time outdoors by going to parks, beaches, their backyards, and outdoor restaurants. Others may have to work outdoors such as farmers, construction workers, and landscapers. Irrespective of whether the exposure to sunlight is voluntary or involuntary, people can be negatively and positively impacted by exposure to sunlight.

The exposure to sunlight, in particular ultraviolet (UV) rays, impacts health, routine body functions, and general wellbeing. For example, exposure to UV rays is one of the primary triggers for a human body to produce vitamin D. Vitamin D plays an integral role in regulating immune system functions, calcium metabolism, and insulin levels. On the other hand, UV rays also negatively impact humans by accelerating aging of skin, increasing risk of skin cancer, destroying vitamin A, and damaging collagen fibers.

With these known negative and positive impacts of exposure to UV rays, it is clear that humans must regulate their exposure to UV rays without completely eliminating exposure. To do so, people use personal measures such as applying sunscreen, wearing hats and visors, and using personal umbrellas. People also use widely applicable measures such as overhangs, large umbrellas, tents, and tinted windows. For example, a person can use a table-top umbrella with his or her backyard furniture as a source of shade, while still getting an appropriate amount of UV rays.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 10 is a block diagram illustrating an example of a processing system in which at least some operations described herein can be implemented.

Figure 1:
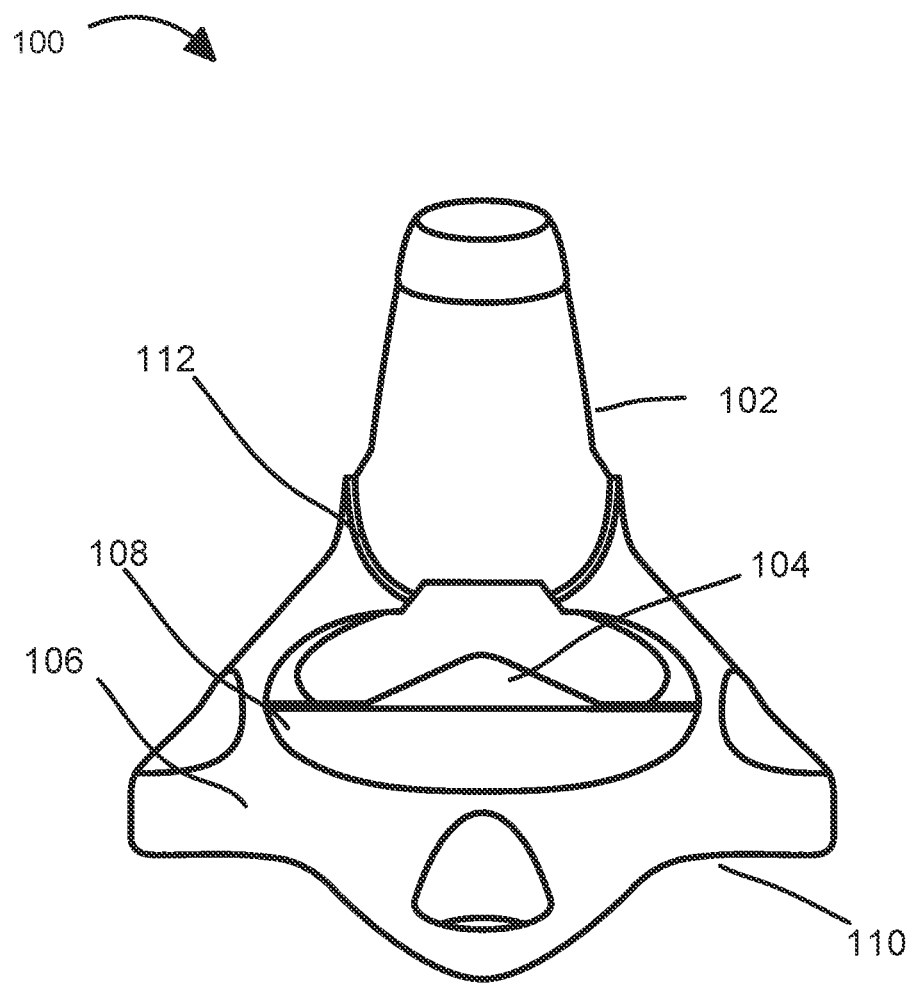
FIG. 1 illustrates an umbrella stand in accordance with an embodiment of the present disclosure.

The drawings depict various embodiments for the purpose of illustration only. Those skilled in the art will recognize that alternative embodiments may be possible without departing from the principles described herein. Accordingly, while specific embodiments are shown in the drawings, the technology is amenable to various modifications.

DETAILED DESCRIPTION

People expose themselves to harmful ultraviolet (UV) rays throughout the regular course of their days. Some people spend time outdoors for work, while others spend time outside for leisure activities. Spending too much time being exposed to UV light can be hazardous at various times of the year. For instance, during the summer months and depending on the location, temperatures can range from 80 degrees Fahrenheit to well over 100 degrees Fahrenheit. Moreover, the UV index, an indicator of the strength of the UV rays and likelihood of getting sunburned, ranges between 6 to 11 (with 11 being the highest) during the summer months. At these temperatures and UV ratings, especially over prolonged intervals of time, there is an increased risk of fatigue, heat stroke, sunburn, dehydration, and other related ailments. Furthermore, repeated and prolonged exposure to such conditions can lead to various forms of skin cancer and aging of skin.

Generally, people that voluntarily spend time outdoors can protect themselves from the UV rays by wearing hats and visors, using umbrellas, applying sunscreen, and taking other preventative measures. Moreover, to reduce the negative effects of UV rays, people can reduce their exposure to the harmful rays by, for example, staying near shaded areas. Shaded areas provide protection from direct exposure to UV rays and have cooler temperatures. Shaded areas are usually formed by trees, tents, canopies, umbrellas, or overhangs.

Even those that voluntarily spend time outside cannot always control their exposure to the sun. For example, a family spending time in their backyard may have an umbrella fixture on their patio furniture. However, the umbrella is not moveable to adapt to where those individuals sit or where the sun moves. Additionally, in some cases, the umbrella may take up table space that could be used to hold beverages, speakers, or other food and/or entertainment devices. Some people may not have furniture that can incorporate an umbrella. Accordingly, introduced here are several different solutions for addressing these issues regarding UV exposure.

Terminology

References herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof.

The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

Technology Overview

FIG. 1 illustrates an umbrella stand in accordance with one embodiment of the present disclosure. Umbrella stand 100 includes holder 102, gap 104, base 106, top side of base 108, bottom side of base 110. Umbrella stand 100 can be made of various materials such as wood, plastic, resin, aluminum, steel, wrought iron, carbon fiber, and/or other materials. In some embodiments, more than one material can be used to make umbrella stand 100. For example, a combination of steel and plastic can be used to make holder 102, and aluminum can be used for base 106. In some embodiments, umbrella stand 100 can have multiple layers of materials. For example, the inside layer can be made of iron. This iron layer can be coated with an outer layer of decorative material, such as glass, plastic, or rubber. In this example, the inside layer of iron can provide for a strong structure and weight to hold an umbrella without tipping over. In addition to being decorative, the outer layer can be protective, such as preventing the inside layer of iron from rust, or preventing a user from bumping his or her hand on a hard iron surface.

Holder 102 can also be various heights, colors, and shapes. For instance, holder 102 can be cylindrical, circular, rectangular, or square. Holder 102 can be hollow and include a top end and a bottom end. The top end can be the first to receive an umbrella (i.e., the handle or shaft) and the bottom end can be closer to gap 104 and base 106. In some embodiments, holder 102 can be a hollow cylinder with a radius that is appropriate to grasp an umbrella handle or shaft. For example, holder 102 can have a radius between 0.5 inches and 5 inches. Additionally, holder 102 can have a height appropriate to secure an umbrella handle or shaft. For example, holder 102 can have a height between 1 inch and 15 inches. In some embodiments, the radius and height of holder 102 can have a positive correlation with each other. For example, when the radius of holder 102 is large (i.e., above 2 inches), the height can be proportionally large (i.e., 15 inches). The height and radius of holder 102 can be chosen to accommodate the lengths and weights of an umbrella. For example, a longer and heavier umbrella can apply more torque on the holder 102 than a shorter, lighter umbrella. In this case, the holder 102 can have a larger height than a holder 102 designed for the shorter umbrella. In some embodiments, the height of holder 102 can be adjustable, such as with a telescoping mechanism. A height adjustable holder 102 can be configured to accommodate a range of umbrella heights or weights.

Gap 104 can act as a handle for a user to hold/grasp umbrella stand 100 and/or as a place for the user to store items such as a personal phone, beverage container, etc. The shape of gap 104 may be based on the type of item to be stored thereon. For example, gap 104 may be substantially circular when designed to store beverage containers. In some embodiments, gap 104 is designed to receive the bottom of an umbrella handle that partially resides within holder 102. Assume, for example, that the umbrella includes an elongate shaft that is connected to a crook handle. In such embodiments, the umbrella can be secured within stand 100 such that at least a portion of the elongate shaft is positioned in holder 102 while the end portion of the crook handle extends upward through gap 104. In some embodiments, holder 102 can be attached to the base 106. Base 106 includes top side of base 108 and bottom side of base 110. Base 106 can be, for example, circular, square, rectangular, or octagonal. The shape of the base 106 can be chosen to provide stability with respect to a desired orientation. For example, a rectangular base 106 can provide additional stability along the longer direction of the rectangle. The shape of the base 106 can also be chosen for aesthetics, such as to complement a surface underneath the umbrella stand 100. For example, a circular base 106 can be placed on a circular table if the user desires matching shapes.

In some embodiments, base 106 can be a hollow cylinder with a radius larger than the radius of holder 102. In some embodiments, base 106 is a solid cylinder with a radius larger than the radius of holder 102 and a height smaller than the height of holder 102. Generally, the height of base 106 can be smaller than the height of holder 102, and the radius of base 106 can be larger than the radius of holder 102. For example, a base 106 can be chosen with a larger radius and smaller height to provide more stability. A holder 102 with a larger height and smaller radius can better assist in holding an umbrella upright to reduce torque applied by the umbrella. For example, holder 102 can have a radius of 1 inch with a height of 12 inches and base 106 can have a radius of 4 inches with a height of 3 inches. Additionally, in some embodiments, base 106 can be made of different materials than holder 102. For example, base 106 can be made of heavy metal, while holder 102 is made of plastic. The heights and radii of base 106 and holder 102 can vary depending on the materials of base 106 and holder 102. For example, a base 106 can have a larger radius if the holder 102 is made of a heavier metal to accommodate the torque applied by the holder 102, while the base 106 can have a smaller radius if the holder 102 is made of a lighter plastic.

Generally, top side of base 108 can include storage means (e.g., cupholders) and can support the bottom of an umbrella handle. Top side of base 108 can include storage options for items such as cell phones, audio players, sunglasses, sunscreen, and the like. Additionally, top side of base 108 can include abutments, bridges, or pillars to connect with holder 102. For example, abutments 112 can be raised from the periphery of the top side of base 108 to couple to holder 102. The holder 102 and abutments 112 can be soldered together, be shaped from the same piece of material (e.g., metal), click into place using snap-fit mechanisms, be glued together, be threaded together, use male-female connection mechanisms, or use other similar mechanisms. In some embodiments, the abutments 112 can be arranged radially about a central axis of the base portion. In some embodiments, the abutments 112 can be arranged non-radially, for example to hold a holder 102 that is not radially symmetric.

Bottom side of base 110 can be a flat surface used for placing umbrella stand 100 on a surface (i.e., table top, floor, or sand). Bottom side of base 110 can also include a coupling mechanism which helps adhere the umbrella stand 100 to a surface. The coupling mechanism can be glue, suction cups, ground spikes, sticky materials (i.e., neoprene or silicone), anti-slip materials (i.e., sandpaper or rubber), magnets, and/or other materials that can help cling the umbrella stand 100 to a surface.

In some embodiments, the coupling mechanism can be replaceable. For example, a user may regularly use umbrella stand 100 on top of a table in his or her backyard. To do so, the user can use suction cups to adhere umbrella stand 100 to the top of the table. On some occasions, the user may travel to the beach and take umbrella stand 100. In order to use umbrella stand 100 at the beach, the user can remove the suction cups and insert ground spikes.

In some embodiments, umbrella stand 100 may not need a coupling mechanism. The umbrella stand 100, instead, can be weighted in order to increase inertia and stability. For example, umbrella stand 100 can be made of a heavy metal such as cast iron. In some embodiments, umbrella stand 100 can use both a coupling mechanism and heavy metals. For example, a user may have a large umbrella with a large area of coverage, which may sway in the wind and topple. However, a weighted (i.e., cast iron) umbrella stand 100 with a coupling mechanism (i.e., suction cups) can help stabilize the umbrella and cling it to a surface.

In some embodiments, the size of the components of umbrella stand 100 can have a relationship with each other such that the size of each component can be proportional to another. For example, holder 102 can be 3 feet in height, while the other components are set at a default height of half a foot. In another example, the entire umbrella stand can be proportionally larger such that each component keeps a default size ratio with another component. For instance, holder 102 and gap 104 can have default height ratio of two to one. Thus, during the manufacturing process, a manufacturer can adjust the heights based on a two to one ratio.

In some embodiments, components of umbrella stand 100 can change sizes. For example, holder 102 can have an extension feature that allows holder 102 to increase and decrease in height. The extension feature can be similar to a telescopic pole, where there is a sequence of cylinders which decrease in diameter. In some embodiments, base 106 can have an extension mechanism to change sizes and increase its footprint. For example, the extension mechanism can be a rectangular plate(s) that slides out from top side of base 108. There can be four rectangular plates, one for each side of a four-sided configuration of base 106.

In some embodiments, umbrella stand 100 can be modular. During the manufacturing process, each component can be coupled to another component using coupling mechanisms such as synching, clasps, hook and eye closures, buckles, rivets, retaining rings, or snap-fit mechanisms. For example, holder 102 and base 106 can be coupled via snap-fit mechanisms. A user may then be able to interchange the components to adjust for environmental conditions, preferences, umbrella size, and/or other relevant conditions.

In some embodiments, umbrella stand 100 can be adjusted to hold an umbrella at various angles. There are multiple ways that umbrella stand 100 can accomplish this. For instance, holder 102 can be coupled to gap 104 via a swivel mechanism which allows holder 102 to move in horizontally and/or vertically. In some embodiments, the swivel mechanism can also include a locking mechanism that locks the swivel mechanism to prevent movement. For example, a user may want to adjust the position of the umbrella based on the location of the sun. To do so, the user can swivel holder 102 such that the sun is blocked, and then subsequently, lock holder 102 in place.

In some embodiments, holder 102 can be made to be accordion-like, which can allow for extension in any direction. For instance, holder 102 can be made of aluminum slats that are configured to move in an accordion-like pattern. Thus, a user can adjust the angle of the umbrella by moving holder 102 into the desired position. In some embodiments, the link between holder 102 and the abutments 112 discussed herein, can be accordion-like; thereby, permitting angling of the umbrella by a user.

Figure 2:
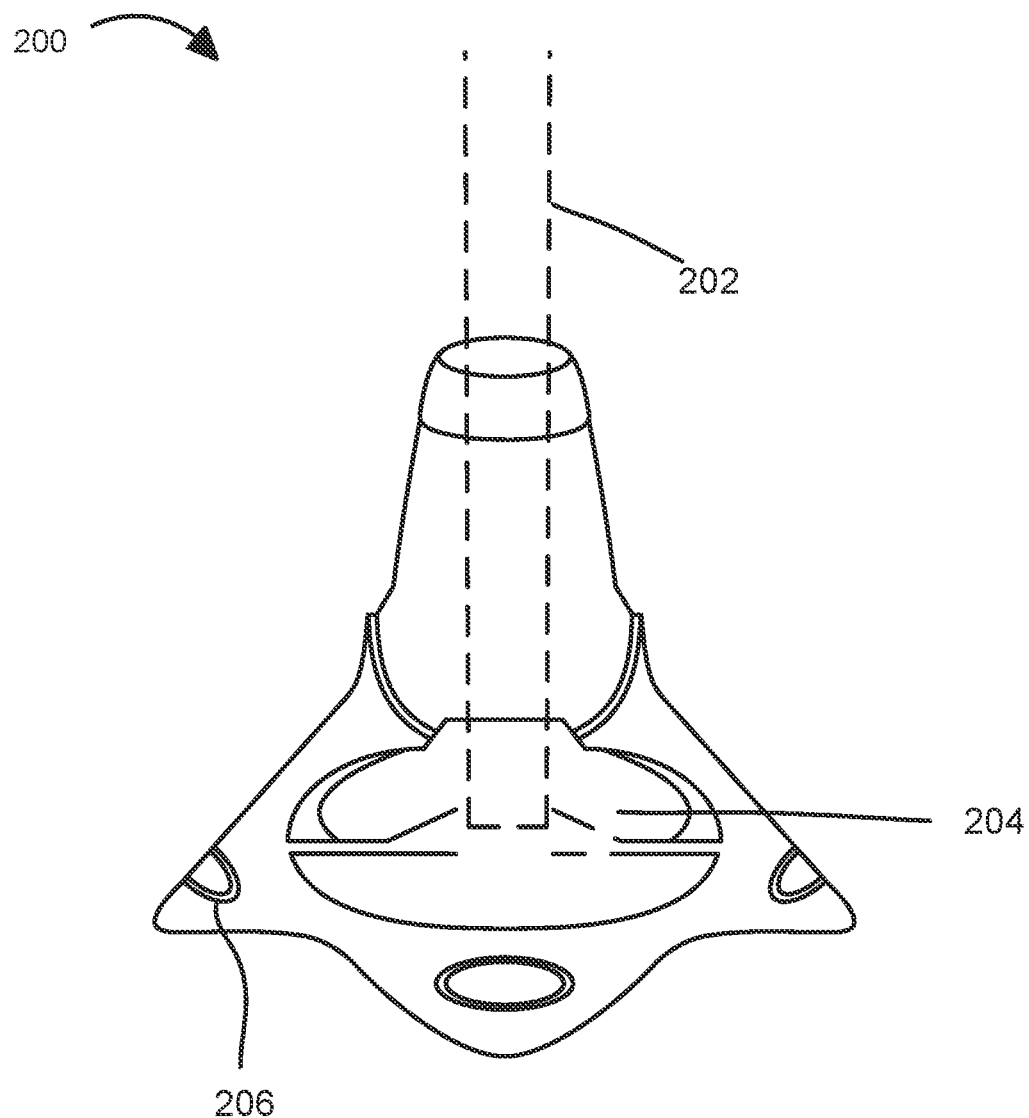
FIG. 2 depicts an umbrella stand holding an umbrella.

FIG. 2 depicts an umbrella stand holding an umbrella. Umbrella stand 200 includes umbrella handle 202, gap 204, and storage 206. Umbrella stand 200 can have similar features as umbrella stand 100. Umbrella handle 202 is inserted through the top of umbrella stand 200 and exits towards gap 204. Gap 204 can be the hollow interior of the base of umbrella stand 200 or the top side of the base of umbrella stand 200. For example, a user may use umbrella handle 202 at the beach. The user may insert a beach umbrella through umbrella handle 202 and gap 204 into the sand below. In another example, gap 204 can extend to the top of the base of umbrella stand 200.

In some embodiments, storage 206 can be configured for holding or storing common accessories and/or devices. For example, storage 206 can be cupholders, phone holders, phone chargers, coin holders, key holders, or sunglass holders. In some embodiments, storage 206 can be a combination of, for example, cupholders and phone holders.

Figure 3:
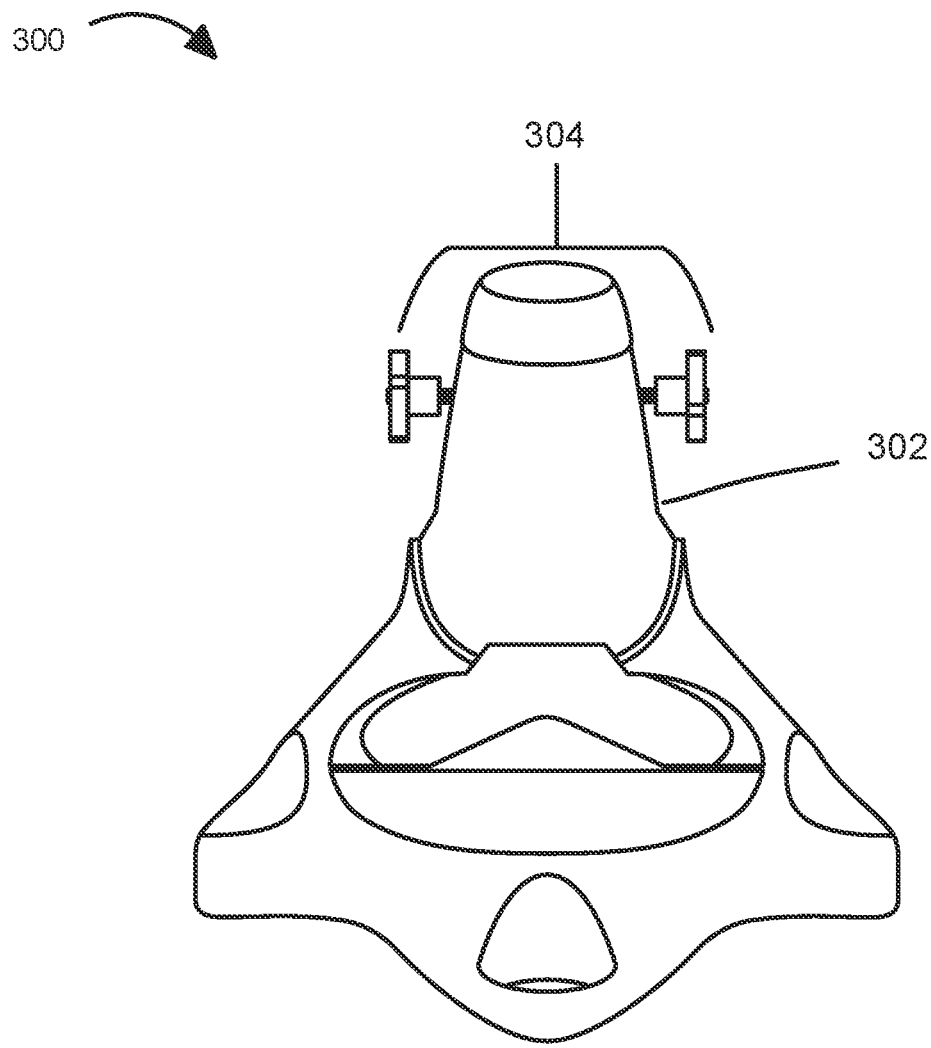
FIG. 3 illustrates a tightening mechanism incorporated within an umbrella stand.

FIG. 3 illustrates a tightening mechanism incorporated within an umbrella stand. Umbrella stand 300 is similar to the those shown in FIG. 1 and FIG. 2. Adjustable holder 302 includes tightening mechanism 304. Adjustable holder 302 is a cylindrical component which receives an umbrella handle. In many situations, the umbrella handles or shafts differ based on the type of umbrella, size of the umbrella, manufacturer of the umbrella, material used to make the umbrella, and other conditions. Moreover, umbrellas tend to sway with the wind and other movement, which makes it difficult to hold the umbrella upright for prolonged time periods.

Thus, in some embodiments, the diameter of adjustable holder 302 can be adjusted using tightening mechanism 304 such that the umbrella handle will be held securely to avoid tilting or swaying. Tightening mechanism 304 can be screws, retaining rings, clamps, clasps, cinching means, and/or other similar mechanisms. In some embodiments, the adjustable holder 302 can have a default diameter, but the tightening mechanism 304 can be used to adjust the grasp on an umbrella handle or shaft. For instance, tightening mechanism 304 can be two screws on diametrically opposite sides of adjustable holder 302. The screws can tighten to pinch and securely hold the umbrella handle or shaft. Additionally, a user can elect to tighten only one of the screws, which can change the angle of the umbrella from 90 degrees relative to a flat surface.

In some embodiments, adjustable holder 302 can have a variable diameter which reduces as the umbrella handle is inserted towards the base. For example, the top of adjustable holder 302 can have a radius of one inch, while the radius near the base can taper down to half an inch. Thus, for example, when an umbrella handle with a radius of 0.7 inches is inserted into adjustable holder 302, it will be securely held in position when the radius of adjustable holder 302 becomes less than 0.7 inches.

Figure 4:
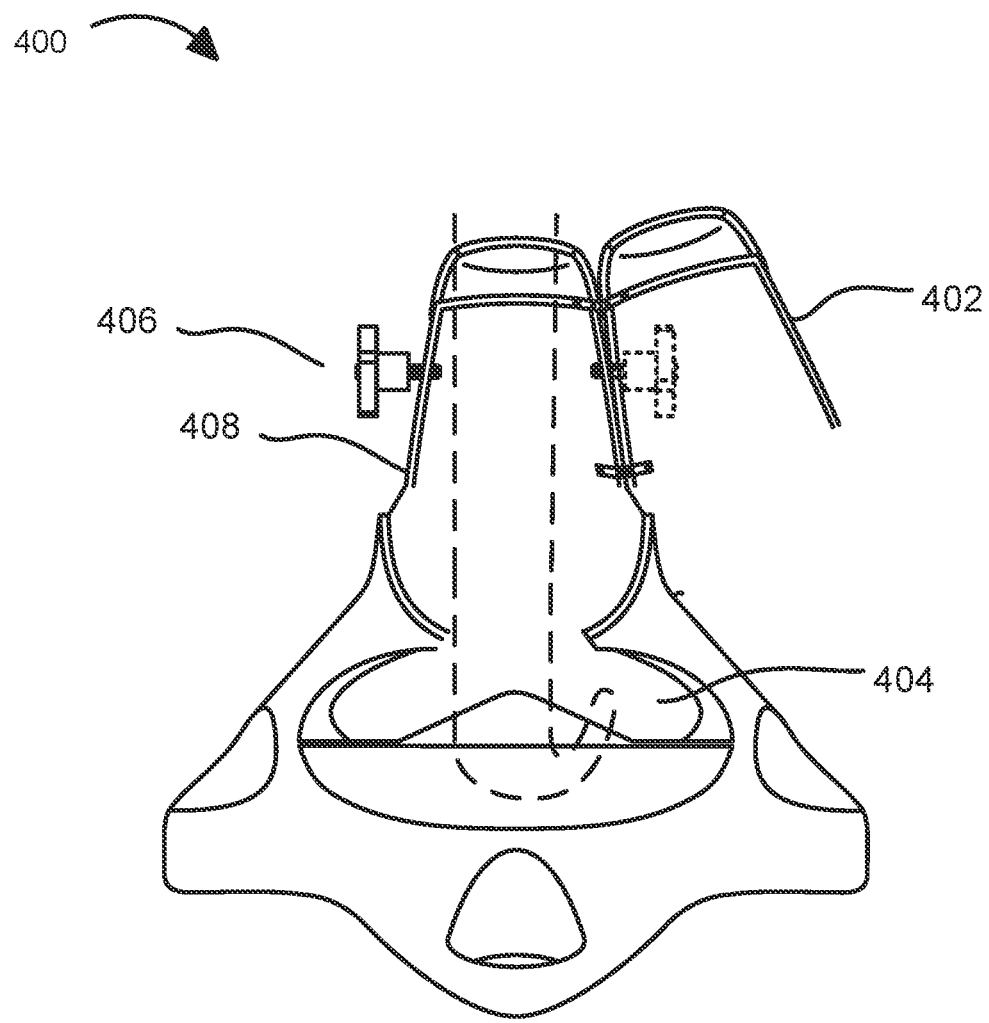
FIG. 4 illustrates an opening feature within the top portion of an umbrella stand.

FIG. 4 illustrates an opening feature within holder portion of an umbrella stand. Umbrella stand 400 can have similar features as those in FIG. 1, FIG. 2, and FIG. 3. Umbrella stand 400 includes door 402, gap 404, screws 406, and openable holder 408. In many situations, umbrellas have handles of various shapes and sizes. For example, many umbrellas have J-shaped/hook-shaped handles, C-shaped handles, decorative features, and/or other protrusions. These types of umbrellas cannot be placed in most umbrella stands, which are only adept at holding cylindrical-shaped umbrella handles.

In some embodiments, door 402 opens the cylindrical holder portion of umbrella stand 400 to receive an umbrella handle. For example, a user may have an umbrella with a J-shaped handle. Normally, an umbrella stand could not hold such an umbrella. However, umbrella stand 400 with door 402 and gap 404 can receive the J-shaped handle. The user can open door 402, place the handle inside, and close door 402. The J-shaped portion of the handle can fit inside gap 404, while the remainder of the umbrella is securely held by openable holder 408.

In some embodiments, multiple features can be combined together in one umbrella stand 400. For example, screws 406 can be incorporated with door 402. A user can open door 402, place the handle, and close door 402. Subsequently, the user can tighten or loosen screws 406 in order to adjust the angle at which the umbrella is being held and/or tighten the grasp on the umbrella handle.

In some embodiments, door 402 can be attached to openable holder 408 by hinges such as spring hinges, barrel hinges, pivot hinges, or strap hinges. In some embodiments, door 402 may be able a removeable part of the openable holder 408. For example, openable holder 408 may use snap-fit means to couple to and detach from door 402. For example, a user can slide door 402 up (i.e., away from the base) using tracks on both the door 402 and openable holder 408 that align with each other. In another example, a user could detach door 402 from openable holder 408 and attach the door 402 to openable holder 408 using click-in-place mechanisms. In yet another example, door 402 can be configured in an accordion-like manner. Thus, to open door 402, a user can push one side of the door 402 to the other side.

Figure 5:
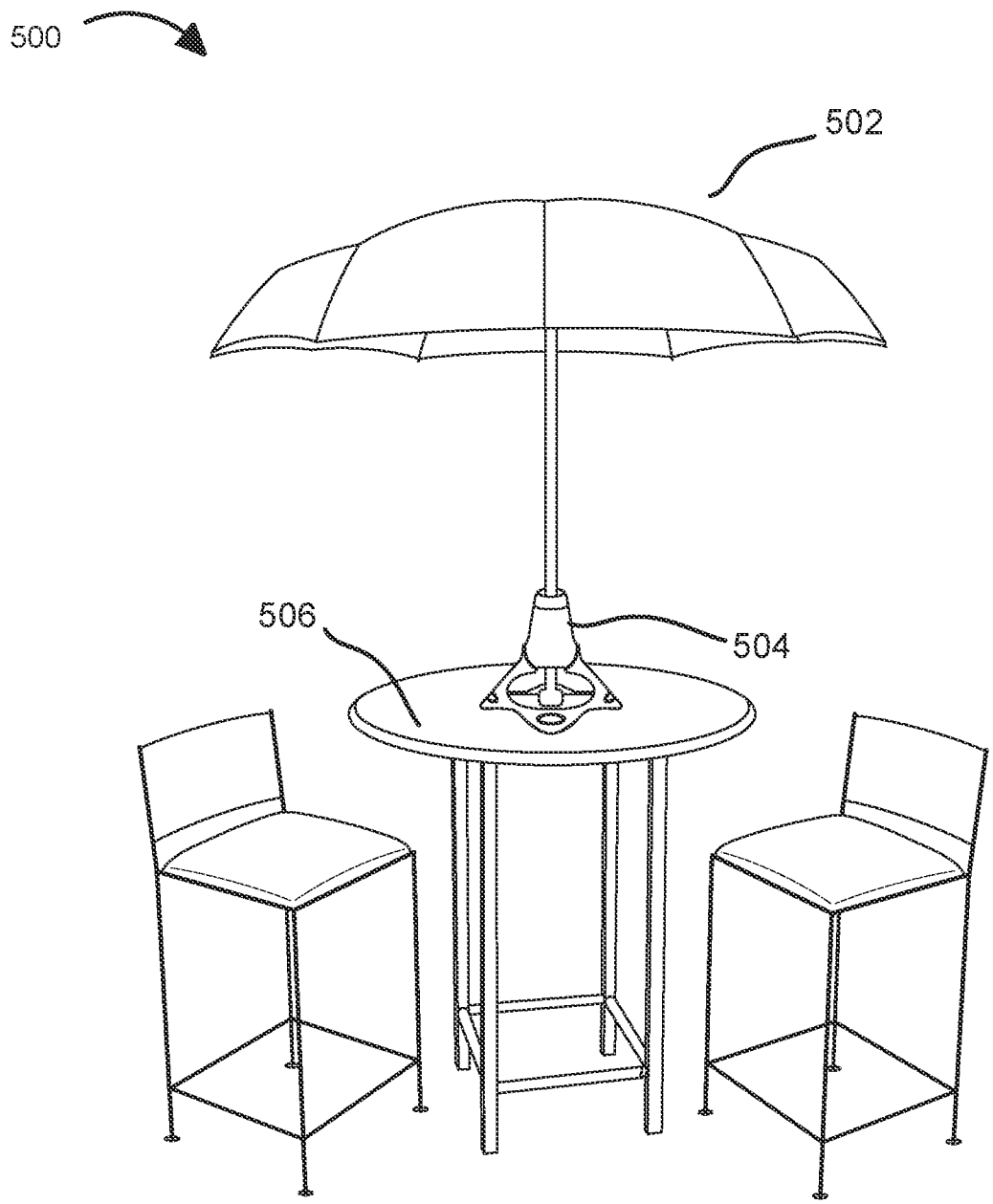
FIG. 5 is an environment that includes the umbrella stand on a table top.

FIG. 5 is an environment that includes the umbrella stand on a table top. Environment 500 includes umbrella 502, stand 504, and table top 506. Umbrella 502 is being held by stand 504. Stand 504 is placed on table top 506. Stand 504 can be similar to the umbrella stands in FIG. 1, FIG. 2, FIG. 3, and FIG. 4. Stand 504 can use various methods to adhere to table top 506. For example, stand 504 can use suction cups to adhere to table top 506. In another example, stand 504 can use a non-slip surface such as rubber. In another example, stand 504 can be bolted into table top 506.

In some embodiments, stand 504 can be used in different environments. For example, stand 504 can be used in beaches, parks, residential areas, urban areas, and/or indoors. In some embodiments, based on the environment 500, the adhering mechanism can be replaced. For example, to adhere to table top 506, a simple non-slip surface such as rubber may be sufficient. Alternatively, at the beach, ground spikes may be required.

Figure 6A:
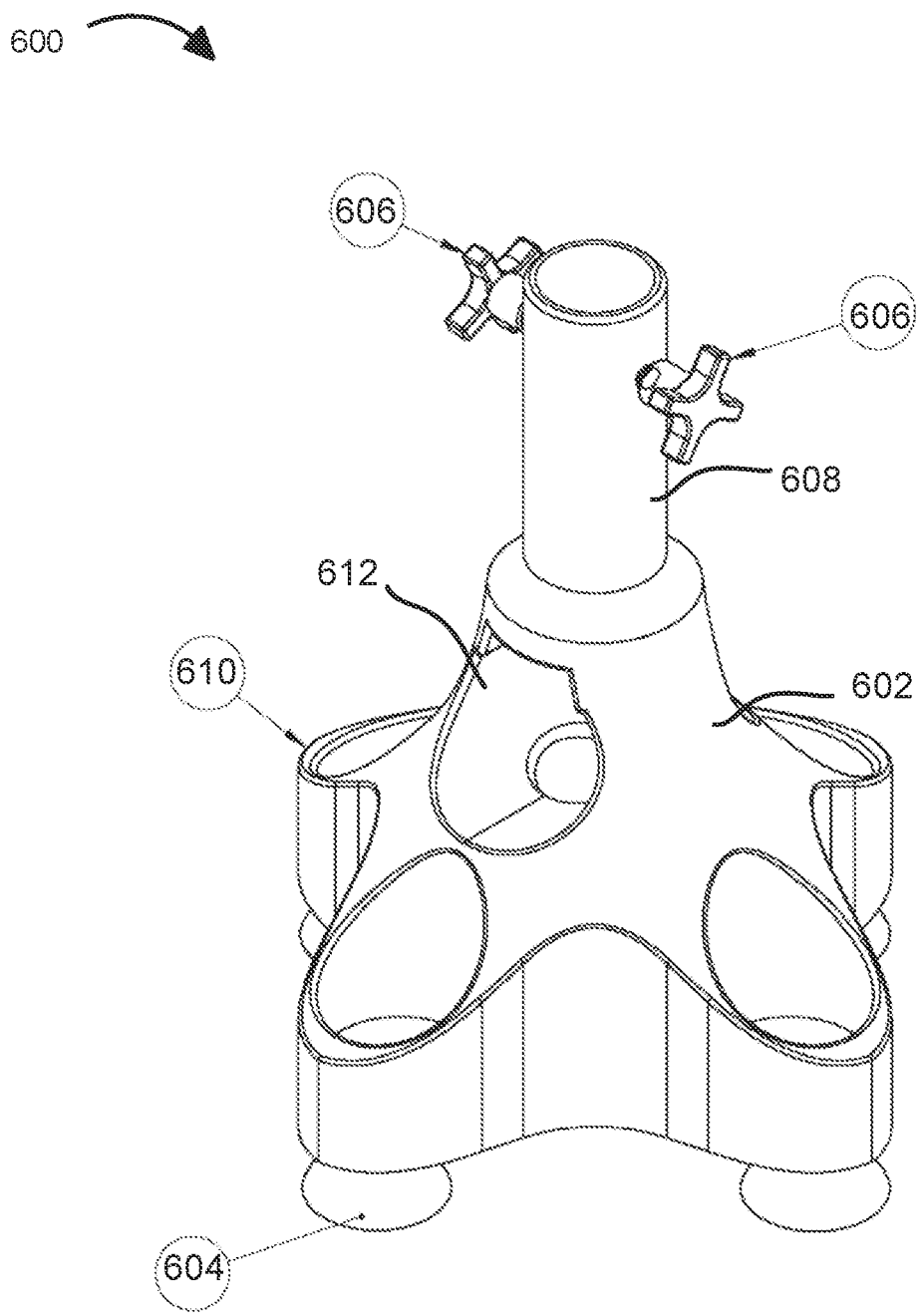
FIG. 6A is a perspective view of an embodiment of an umbrella stand.

FIG. 6A is a perspective view of an embodiment of umbrella stand 600. Umbrella stand 600 can be similar to the umbrella stands in FIGS. 1-5. As shown, umbrella stand 600 includes base 602, feet 604, screws 606, holder 608, storage 610, and gap 612. The base 602 can be made of a heavy material, such as metal. The feet 604 can be rigid or be flexible to secure the base 602 to a surface. For example, the feet 604 can be made of rigid rubber. In another example, the feet can be flexible suction cups to adhere to a smooth surface underneath feet 604. The feet 604 can be removable, such that they can be replaced with a different set of feet 604. Additionally, the base 602 can sit on a surface, such as a table, directly. The screws 606 can be inserted into holes in holder 608. The screws 606 can be tightened, for example by turning screws 606 clockwise. The screws 606 can be tightened to secure an umbrella in umbrella stand 600 or loosened to release the umbrella. The screws 606 can be tightened or loosened individually or in conjunction. For example, the screws 606 can be tightened such that an umbrella secured by the screws 606 stands vertically. In another example, the screws 606 can be adjustably tightened such that an umbrella secured by the screws 606 rests at a non-zero angle with respect to the vertical axis. Although FIG. 6 displays two screws 606, there can be different numbers of screws, such as one, three, four, etc. The holder 608 can be hollow cylinder and attached to base 602. The gap 612 can receive an umbrella handle. The holder 608 can be attached to base 602 such that the umbrella handle extends through the holder 608 to the gap 612.

In an example usage scenario, a user can place umbrella stand 600 on an outdoor glass table. The user can then add removable feet 604, which in this example can be suction cups, to base 602. The feet 604 can then be used to secure the umbrella stand 600 to the table. The user can then place an umbrella with a J-shaped handle into the umbrella stand 600, for example by opening a door in holder portion 608 (not pictured in FIG. 6A) or if the J-shaped handle's curvature allows, through an opening at the top of holder 608. The user can extend the end of the J-shaped handle through gap 612 while the straight portion of the handle sits within holder 608, thus allowing the umbrella stand 600 to receive the J-shaped handle. Finally, the user can tighten screws 606 to secure the umbrella in an upright position.

Figure 6B:
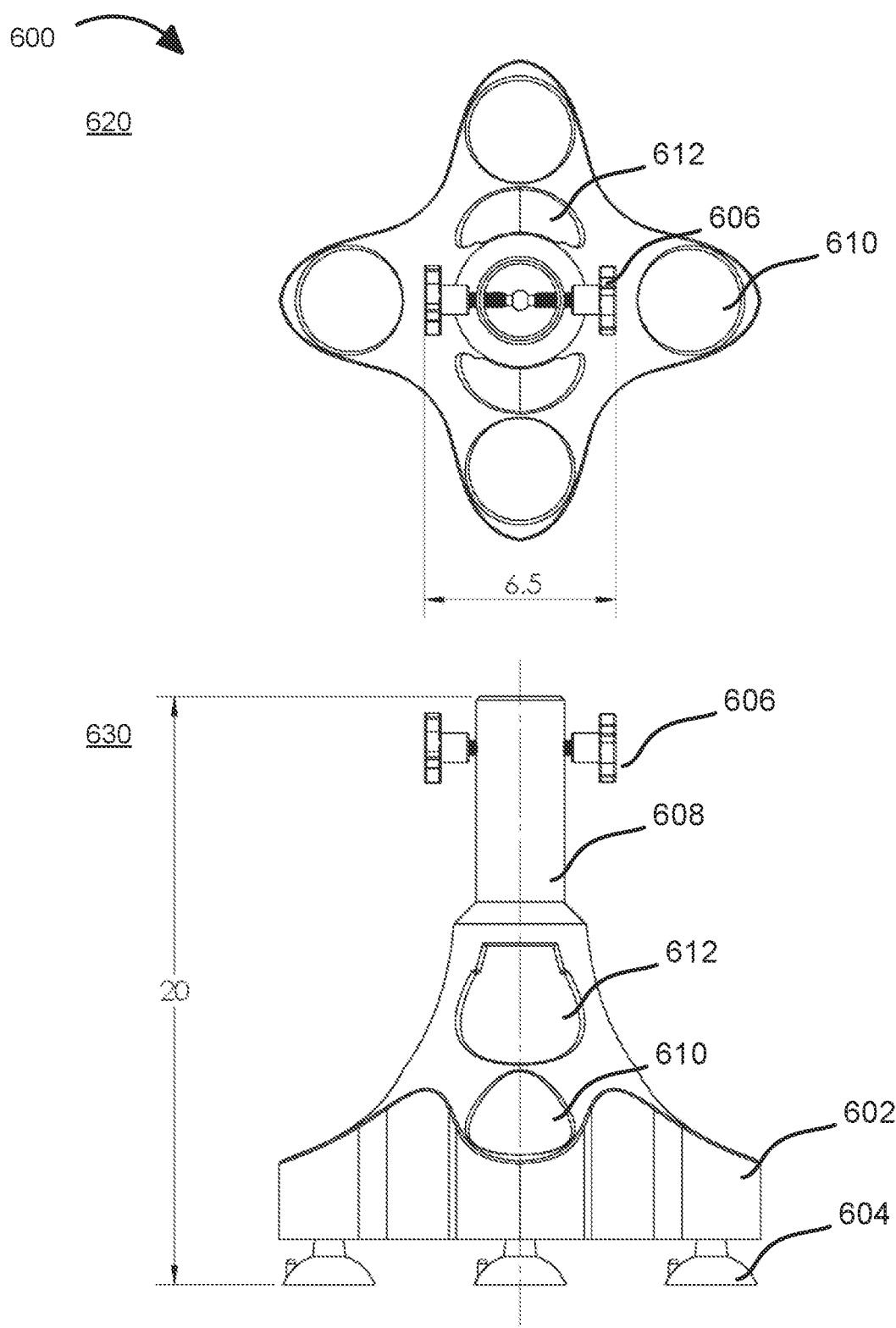
FIG. 6B shows a top view and a side view of an embodiment of an umbrella stand.

FIG. 6B shows a top view 620 and side view 630 of an embodiment of umbrella stand 600. In some embodiments, the distance between the ends of screws 606 can be 6.5 inches, as shown in top view 620. In some embodiments, the height of umbrella stand 600 can be 20 inches, as shown in side view 620.

Figure 6C:
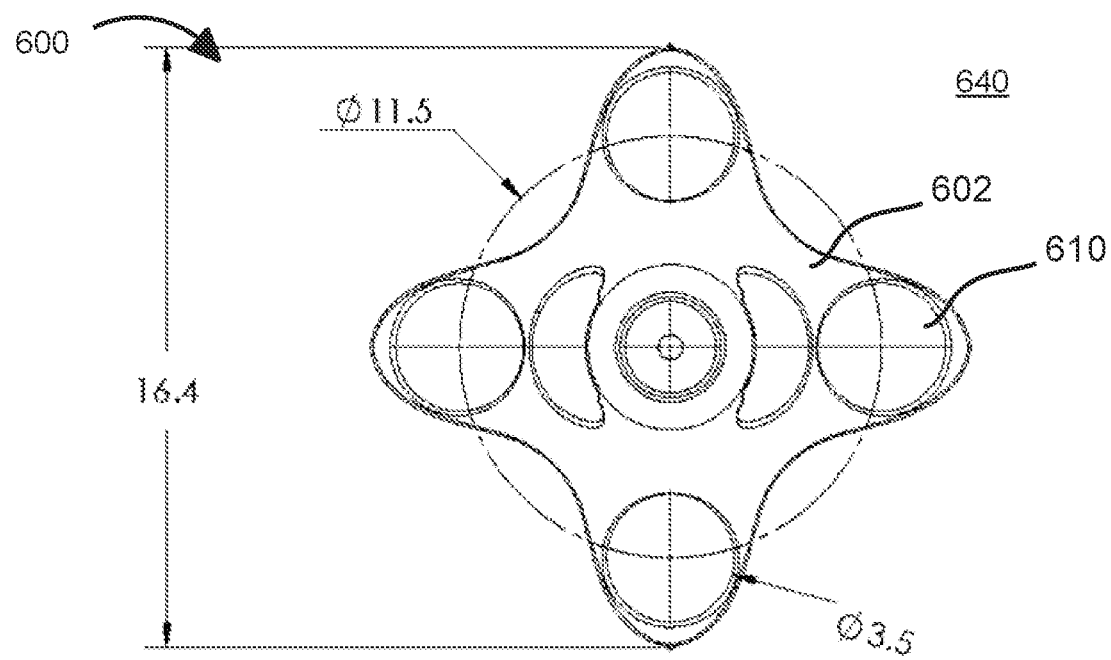
FIG. 6C shows a top view and a cross-sectional view of an embodiment of an umbrella stand.
Figure 6C:
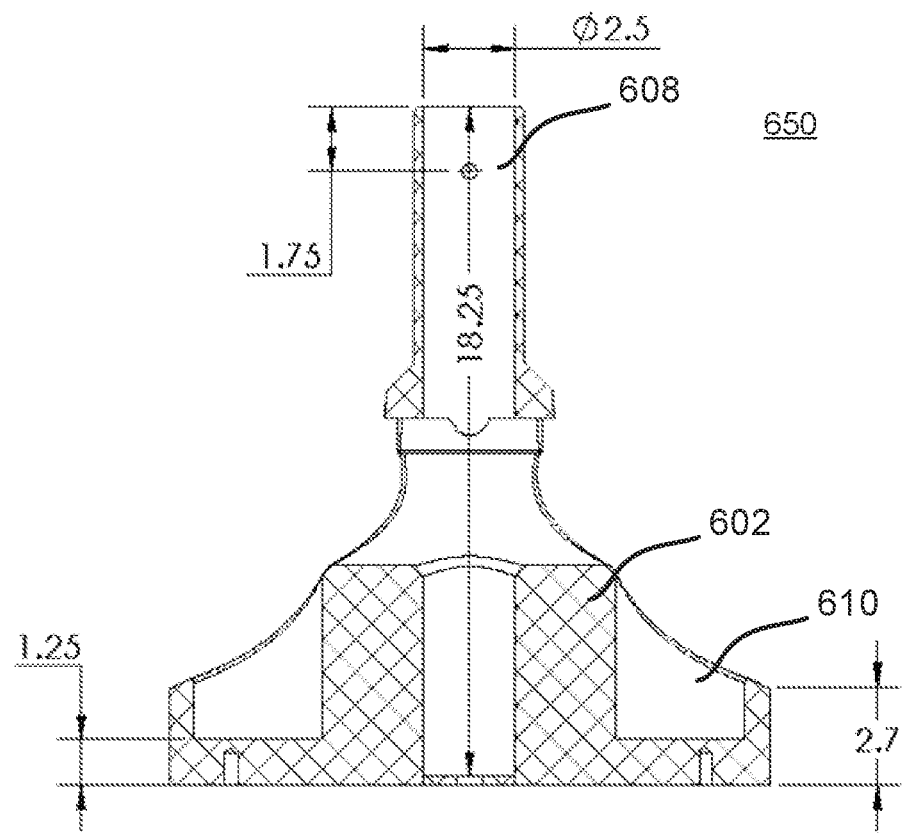

FIG. 6C shows a top view 640 and cross-sectional view 650 of an embodiment of umbrella stand 600. In some embodiments, a length of base 602 can be 16.4 inches as measured across its longest dimension, as shown in top view 640. In some embodiments, the base 602 can have four-fold symmetry, as shown in top view 640. In some embodiments, storage 610 can comprise 4 circular openings in base 602, with the radius of each storage 610 being 3.5 inches. The storage 610 can be disposed symmetrically about a center axis of the base 602, as shown in top view 640. The distance between the centers of opposite storage 610, as shown in top view 640, can be 11.5 inches.

As shown in cross-sectional view 650, the inside diameter of holder 608 can be 2.5 inches. The distance from the top of holder 608 to a hole for screw 606 can be 1.75 inches. The vertical distance from the top of holder 608 to an interior surface of base 602 can be 18.25 inches. The height of a peripheral surface of base 602 can be 2.7 inches. The distance from the bottom of base 602 to a bottom surface of storage 610 can be 1.25 inches.

Figure 6D:
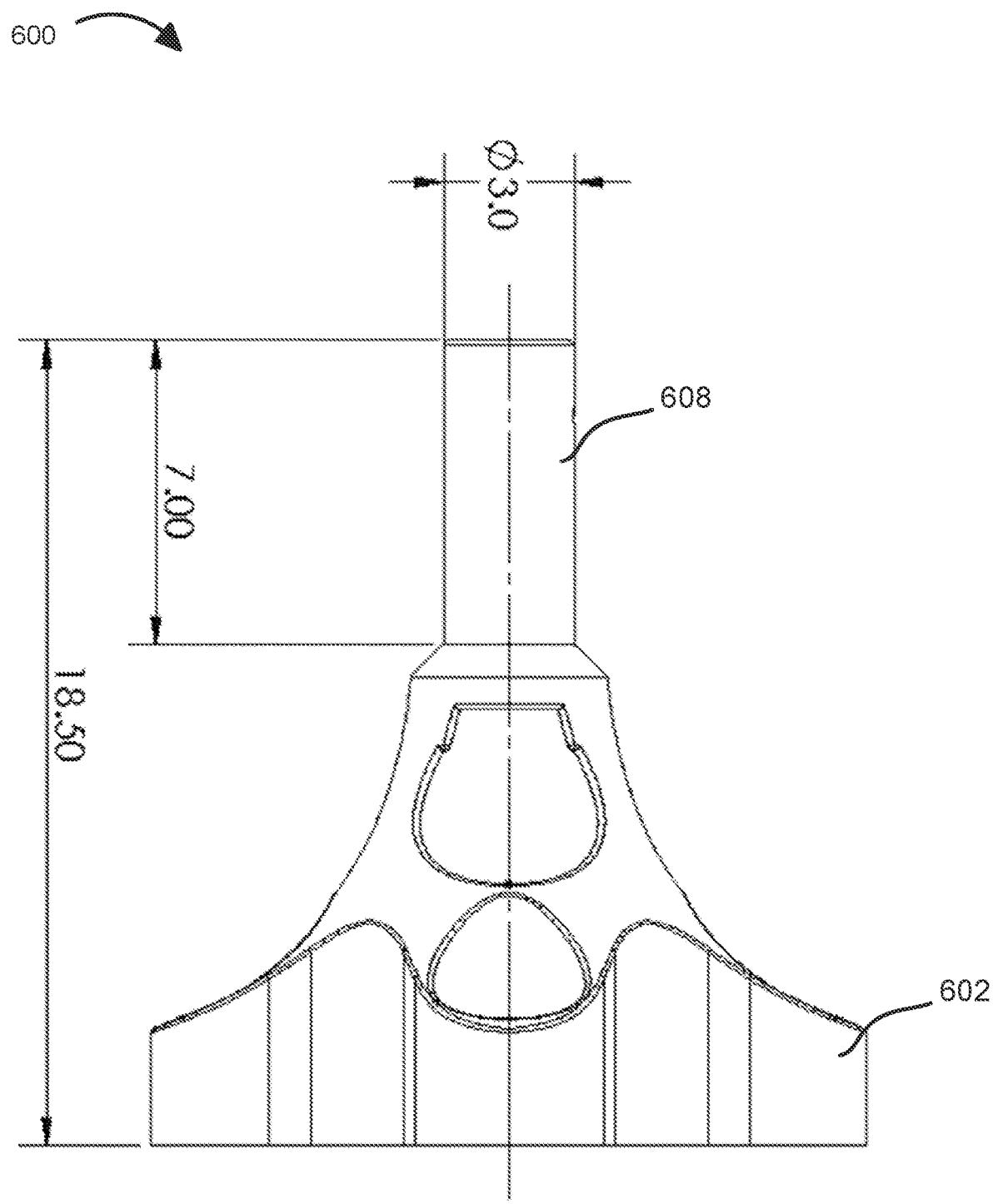
FIG. 6D shows a side view of an embodiment of an umbrella stand.

FIG. 6D shows a side view of an embodiment of umbrella stand 600. As shown, feet 604 have been removed. In some embodiments, the length of holder 608 can be 7 inches, and the outside diameter of holder 608 can be 3 inches. In some embodiments, the height of umbrella stand 600 without feet 604 can be 18.5 inches.

Figure 6E:
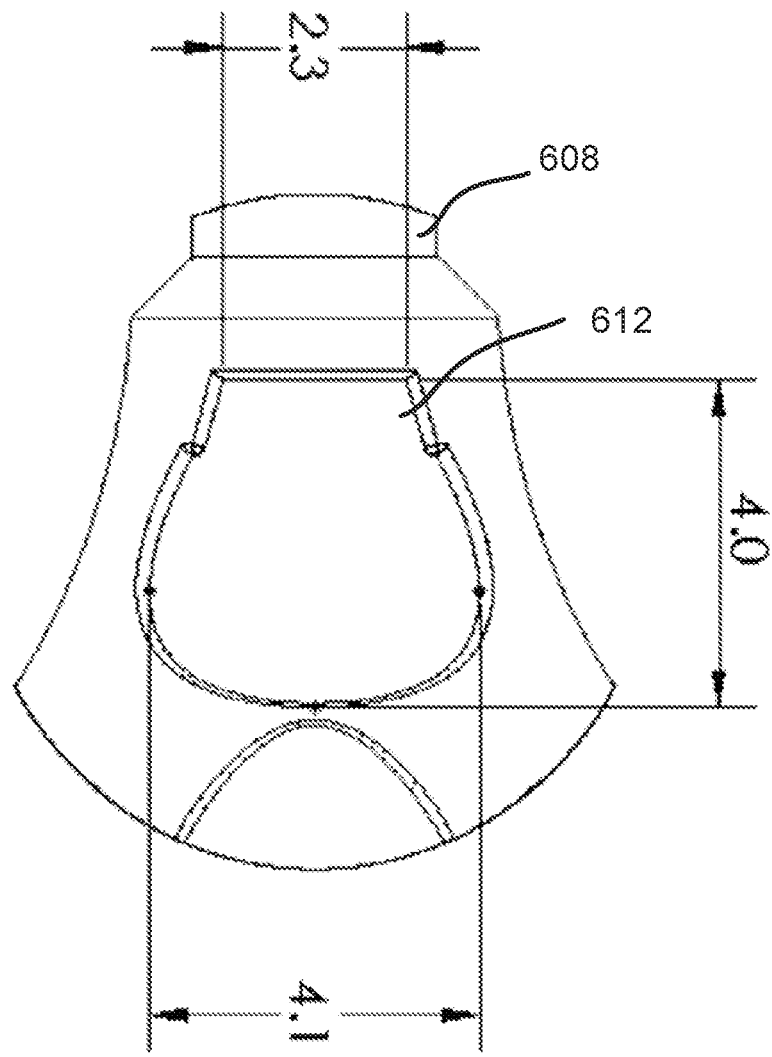
FIG. 6E shows a gap according to some embodiments

FIG. 6E shows gap 612 according to some embodiments. Note holder 608 is shown truncated in this view to focus on the gap 612. The gap 612 can be configured to receive an umbrella handle. For example, a J-shaped portion of an umbrella handle can fit through gap 612 while a shaft of an umbrella can fit in holder 608. The shape of gap 612 can be configured to receive a variety of different shapes of umbrella handles and different objects. For example, the gap 612 as shown in FIG. 6E can have a curved bottom portion which tapers toward a top flat portion. This shape can receive a variety of handle shapes, such as J-shaped handles, cylindrical handles, flat-bottom handles, or round-bottom handles. In some embodiments, the width of the gap 612 at the widest part of the curved portion can be 4.1 inches, the height of the gap 612 can be 4 inches, and the width of the gap 612 at the top flat portion can be 2.3 inches.

In some embodiments, the umbrella stand can include electronic components, such as touchscreen displays, speakers, microphones, cameras, radios, motion sensors, communications components, etc., as well as processors, memory, and circuitry to implement various hardware and software described herein. For example, the umbrella stand can include speakers which can be configured to play music selected from a user's mobile device.

Figure 7:
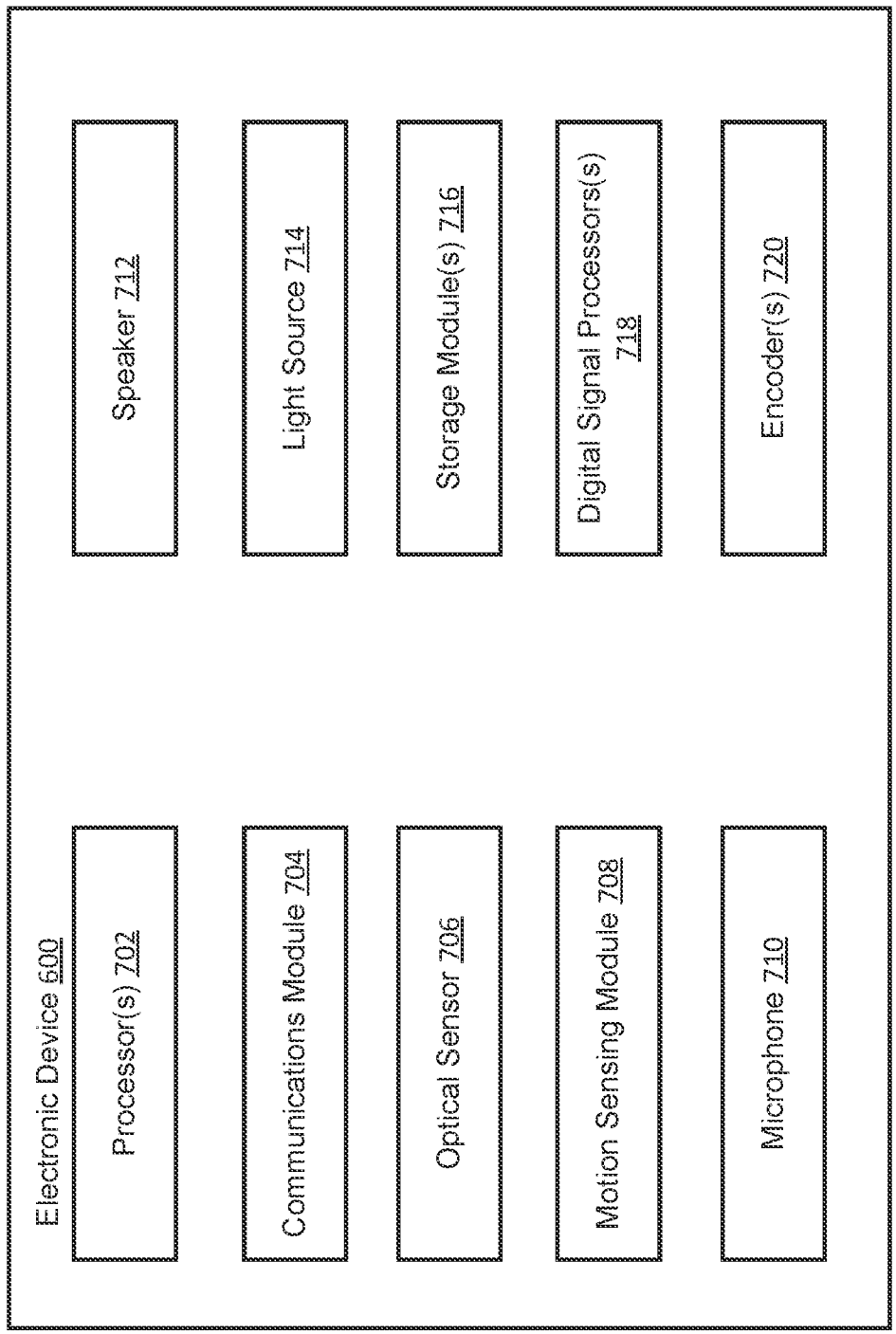
FIG. 7 illustrates a high-level functional block diagram of the architecture of an electronic device that can be used to implement disclosed embodiments.

FIG. 7 illustrates a high-level functional block diagram of the architecture of an electronic device that can be used to implement disclosed embodiments. In some embodiments, the umbrella stands described herein can include wireless connectivity and communication capabilities. Electronic device 700 can be used to monitor and analyze an environment and provide recommendations for adjustments to various aspects of the environment. Electronic device 700 can include one or more processor(s) 702, communications module 704, optical sensor 706, motion sensing module 708, microphone 710, speaker 712, light source 714, storage module(s) 716, digital signal processor(s) 718, and/or encoder(s) 720.

The processor(s) 702 can execute instructions stored in storage module(s) 716, which can be any device or mechanism capable of storing information. Communications module 704 can manage communication between various components of the electronic device 700, other network connected devices, and/or users. For example, communications module 704 can facilitate communication between a user's smart device within the user's home, while the user is in his or her backyard using the umbrella stand.

In some embodiments, communications module 704 can facilitate communication with a mobile phone, tablet computer, wireless access point (WAP), etc. For example, communications module 704 can be configured to transmit content generated at electronic device 700 to another network-connected device such as the mobile device of a user. The communications module 704 can communicate wirelessly, for example, via Bluetooth, Wi-Fi, Zigbee, 4G, 5G, near-field communication, or other wireless communication methods. In some embodiments, the communications module 704 can communicate via a wired connection, such as USB, ethernet, eSATA, FireWire, Thunderbolt, or other wired connections. The wired connection can also enable the electronic device 700 to charge a mobile device of a user.

Optical sensor 706 can be configured to generate optical data related to the nearby environment in which the umbrella stand is placed. An optical sensor 706 could be any device which converts light into an electrical signal such as photoconductive devices or photo diodes. In some embodiments, optical sensor 706 can be configured to generate video(s) or image(s) of the nearby environment in response to, for example, movement detected by motion sensing module 708, or a voice command heard through microphone 710 and interpreted by processor(s) 702.

The optical sensor 706 may in communication with the digital signal processor(s) 718 (DSP). The DSP can be a microprocessor that executes instructions to process analog signals. After processing by the DSP 718, the signal may be output to encoder(s) 720. Encoder(s) 720 can be used to convert digital video data from one format to another. Microphone 710 can be configured to record sounds within the nearby environment. The electronic device 700 may include multiple microphones. In such embodiments, the microphones may be omnidirectional microphones designed to pick up sound from all directions or directional microphones designed to pick up sounds coming from a specific direction. For example, if the electronic device 700 coupled to an umbrella stand is intended to be mounted in a certain orientation (e.g., such that there is sufficient shade for the users), then the electronic device 700 may include at least one microphone arranged to pick up sounds originating from where the users are seated.

The speaker 712 can be configured to convert an electrical audio signal into a corresponding sound that is projected into the environment. For example, a user of an umbrella stand with electronic device 700, can use both the speaker 712 and microphone 710 to converse with another person outside of the same environment (e.g., inside the home). The other person may, for example, have a computer program (e.g., a mobile application) installed on her mobile phone configured to communicate with electronic device 700.

Light source 714 can be configured to illuminate the nearby environment. For example, light source 714 may illuminate the nearby environment in response to an indication from motion sensing module 708 that motion has been detected. Similarly, light source 714 can also react to vocal instructions received through microphone 710 and interpreted by processor(s) 702.

Embodiments of electronic device 700 may include some or all of these components, as well as other components not shown here. For example, an umbrella stand may not have space to house all the components, and/or certain use restrictions may limit usage of the components. In another example, electronic device 700 may include a display. The display, along with the other components of electronic device 700, can allow a user to mirror his or her mobile phone screen; thereby, allowing a user to control his or her mobile phone, take calls, use mobile applications, etc.

Figure 8:
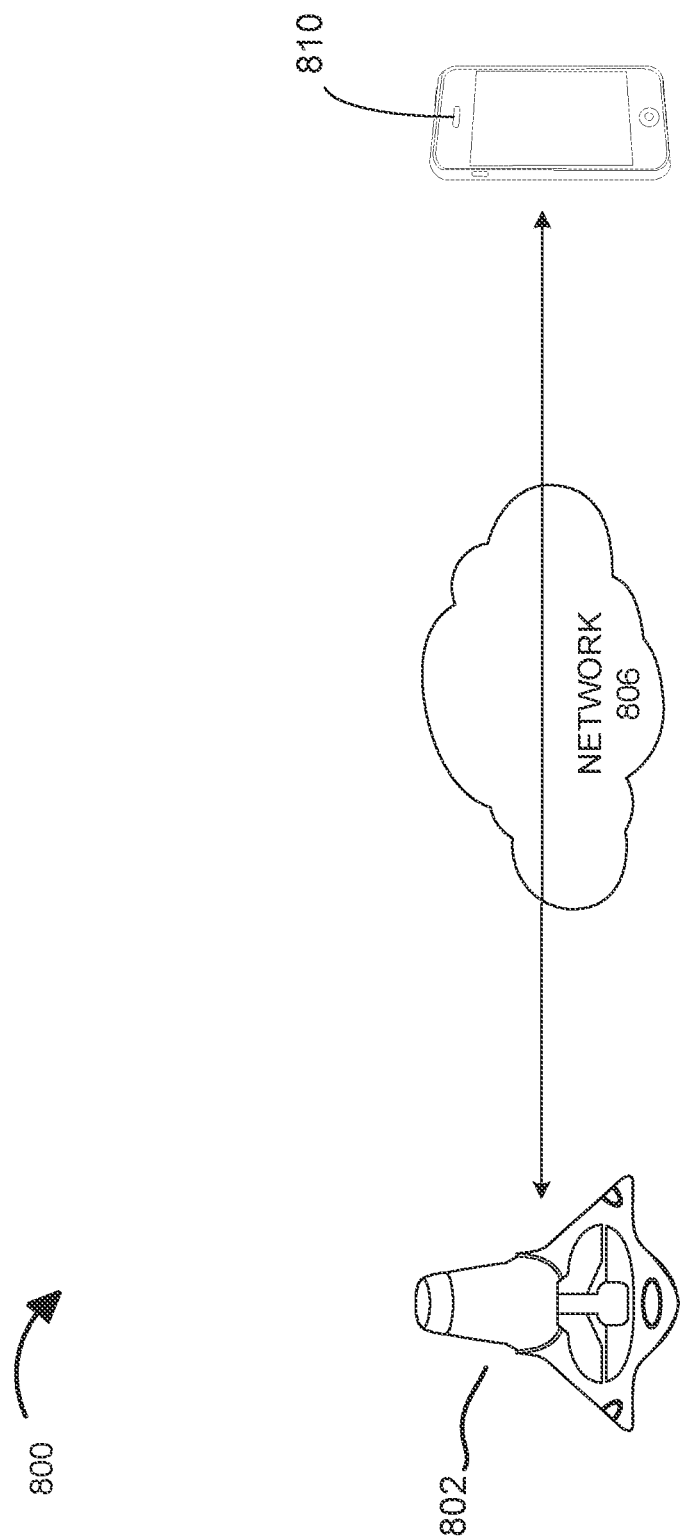
FIG. 8 is a diagram of a system that may be used to implement features of some of the disclosed embodiments.

FIG. 8 is a diagram of a system that may be used to implement features of some of the disclosed embodiments. The system 800 can include umbrella stand 802 and user device 810 which are connected over one or more networks 806, such as the internet. As shown, the umbrella stand 802 can send communications to and receive communications from user device 810 through the network 806. These communications can be facilitated, for example, through an application on user device 810 and/or umbrella stand 802. In some embodiments, the umbrella stand 802 can communicate directly with user device 810. In other embodiments, the umbrella stand 802 or user device 810 can be connected through network 806 to an external server.

The network 806 may include any combination of private, public, wired, or wireless portions. Any control information or data communicated over the network 806 may be encrypted or unencrypted at various locations or along different portions of the network 806. Each component of the system 800 may include combinations of hardware and/or software to process the data, perform functions, communicate over the network 806, and the like. For example, any component of the system 800 may include a processor, memory or storage, a network transceiver, a display, operating system and application software (e.g., for providing a UI), and the like. Other hardware or software components of the system 800 that are well known to persons skilled in the art are not shown or discussed herein for brevity.

Figure 9:
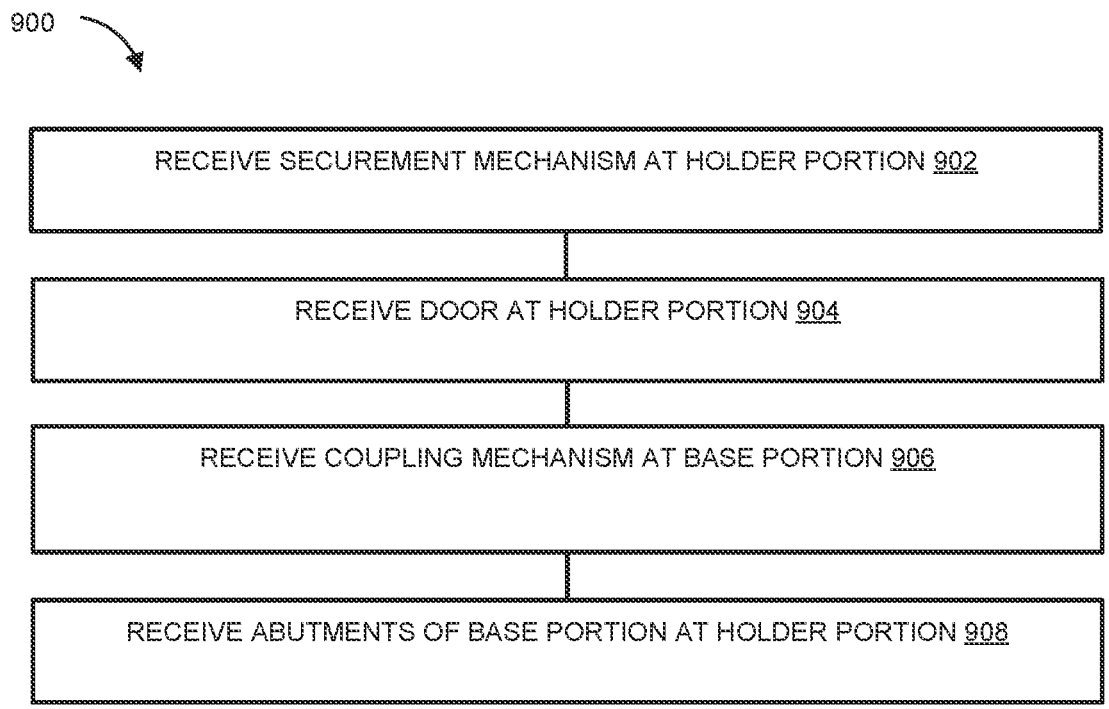
FIG. 9 is a block diagram illustrating an example method of assembling an umbrella stand.

FIG. 9 is a block diagram illustrating an example method 900 of assembling an umbrella stand. At block 902, a holder portion can receive a securement mechanism. The securement mechanism can comprise screws, retaining rings, clamps, clasps, cinching means, and/or other similar mechanisms. In some embodiments, the securement mechanism can be used to adjust the grasp on an umbrella handle or shaft within the holder portion. For instance, the securement mechanism can be two screws and received by holes drilled on opposite sides of the holder portion. The screws can tighten to pinch and securely hold the umbrella handle or shaft.

At block 902, the holder portion can receive a door. In some embodiments, the door opens the holder portion to receive an umbrella handle. In some embodiments, the holder portion receives the door by hinges such as spring hinges, barrel hinges, pivot hinges, or strap hinges. In some embodiments, the door may be a removeable part of the holder portion. For example, the holder portion can receive the door by snap-fit means to couple to and detach the door from the holder portion. For example, the door can slide onto the holder portion using tracks on both the door and holder portion that align with each other. In another example, door can be attached or detached from the holder portion using click-in-place mechanisms. In yet another example, the door can be configured in an accordion-like manner.

At block 906, a base portion can receive a coupling mechanism. The coupling mechanism can be received at a bottom side of the base portion facing a flat surface used for placing the base portion on a surface (i.e., table top, floor, or sand). The coupling mechanism can help adhere the base portion to the surface. The coupling mechanism can be glue, suction cups, ground spikes, sticky materials (i.e., neoprene or silicone), anti-slip materials (i.e., sandpaper or rubber), magnets, and/or other materials that can help cling the umbrella stand to a surface. The base portion can receive the coupling mechanism in different ways depending on the type of coupling mechanism. For example, ground spikes may be received by holes on the bottom side of the base portion. In another example, the base portion can receive rubber feet using adhesive or screws.

In some embodiments, the coupling mechanism can be replaceable. For example, the base portion can receive removable suction cups, which can be replaced with removable ground spikes. In this case, the base portion can receive the coupling attachments using the same attachments. For example, the suction cups can be screwed into holes of the base portion, and the ground spikes can be screwed into the same holes. In another example, the base portion can include different holes to accommodate different replaceable coupling mechanisms.

At block 908, the holder portion receives the base portion. The holder portion can receive the base portion via multiple abutments of a top surface of the base portion. Additionally, the top surface of the base portion can include abutments, bridges, or pillars to connect with the holder portion. For example, abutments can be raised from the periphery of the top surface of the base portion to couple to the holder portion. The holder portion and the base portion can be soldered or welded together, click into place using snap-fit mechanisms, be glued together, be threaded together, use male-female connection mechanisms, or use other similar mechanisms. Also, holder portion can receive a base portion by forming the base and holder portions from the same piece of material (e.g., metal) to form a unibody construction. In some embodiments, the abutments can be arranged radially about a central axis of the base portion. In some embodiments, the abutments can be arranged non-radially, for example to engage a holder portion that is not radially symmetric.

The method 900 is not limited to the order shown in FIG. 9, and the steps can be performed in any order. For example, attaching securement mechanism to holder portion (902) or attaching coupling mechanism to base portion (906) can occur after attaching holder portion to the base portion (908). Attaching the door to holder portion (904) can be performed before attaching a securement mechanism to the holder portion (902). Similarly, the method 900 is not limited to the steps as shown in FIG. 9 and can include additional steps. For example, the method 900 can further include modifying the base portion or holder portion, such as installing electronic components or forming a cavity for a cup holder.

FIG. 10 is a block diagram of a computer system that may be used to implement features of some of the disclosed technology. The computing system 1000 may be a modular device, a system, a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 1000 may include one or more central processing units ("processors") 1002, memory 1004, input/output devices 1006 (e.g., keyboard and pointing devices, touch devices, display devices), storage devices 1008 (e.g., disk drives), and network adapters 1010 (e.g., network interfaces) that are each connected to an interconnect 1012. The interconnect 1012 is illustrated as an abstraction that represents any one or more separate physical buses, point to point connections, or both connected by appropriate bridges, adapters, or controllers. The interconnect 1012, therefore, may include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., Firewire).

The memory 1004 and storage devices 1008 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 1004 can be implemented as software and/or firmware to program the processor 1002 to carry out actions described above. In some embodiments, such software or firmware may be initially provided to the computing system 1000 by downloading it from a remote system through the computing system 1000 (e.g., via network adapter 1010).

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. An umbrella stand comprising:
a base portion including:
a bottom surface, and
a top surface,
wherein the bottom surface includes a replaceable coupling mechanism for attaching the base portion to a surface, wherein the replaceable coupling mechanism is replaceable among a group including ground spikes and at least one other coupling mechanism;
a holder portion including:
an elongate segment extending upward from the base portion, the elongate segment having a cavity defined therein that is accessible via an open end configured to receive a handle of an umbrella;
a securement mechanism configured to secure the umbrella within the cavity of the elongate segment;
an electronic device including:
a processor,
a network interface configured to communicate over a wireless network, a microphone configured to receive sound from a local environment, and a memory having instructions stored thereon, which, when executed by the processor, cause the electronic device to: based on the received sound, communicate with an external device via the network interface over the wireless network; and
wherein the base portion and the holder portion are joined such that the handle of the umbrella extends from the cavity through a gap between the base portion and the holder portion.

2. The umbrella stand of claim 1, wherein the at least one other coupling mechanism comprises: suction cups, rubber, or magnets, or ground spikes.

3. The umbrella stand of claim 1, wherein a diameter of the cavity of the elongate segment tapers downward toward the open end.

4. The umbrella stand of claim 3, wherein the diameter of the cavity at the open end is less than a diameter of the handle of the umbrella.

5. The umbrella stand of claim 1, wherein the securement mechanism comprises screws.

6. The umbrella stand of claim 1, wherein the base portion and the holder portion comprise a unibody structure.

7. The umbrella stand of claim 1, wherein the handle of the umbrella is hook shaped.

8. The umbrella stand of claim 1, wherein the holder portion includes a door.

9. The umbrella stand of claim 1, wherein the holder and base portions are comprised of wood, plastic, resin, aluminum, steel, carbon fiber, wrought iron, or any combination thereof.

10. The umbrella stand of claim 9, wherein the holder and base portions are comprised of different materials.

11. The umbrella stand of claim 1, wherein the top surface of the base portion further includes at least one cylindrical cavity at least 3.5 inches in diameter.

12. The umbrella stand of claim 11, wherein the cylindrical cavity of the top surface of the base portion extends through the bottom surface of the base portion.

* * * * *